United States Patent
Soda (10) Patent No.: US 9,262,706 B2
(45) Date of Patent: Feb. 16, 2016

(54) IMAGE FORMING APPARATUS THAT CONTROLS JETTING OF TONER, IMAGE PROCESSING APPARATUS, CONTROL METHOD THEREFOR, AND STORAGE MEDIUM

(71) Applicant: CANON KABUSHIKI KAISHA, Tokyo (JP)

(72) Inventor: Yuji Soda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/319,632

(22) Filed: Jun. 30, 2014

(65) Prior Publication Data

US 2015/0009530 A1 Jan. 8, 2015

(30) Foreign Application Priority Data

Jul. 2, 2013 (JP) .................. 2013-138803

(51) Int. Cl.
| | |
|---|---|
| H04N 1/04 | (2006.01) |
| G06F 3/12 | (2006.01) |
| G03G 15/30 | (2006.01) |
| G03G 21/14 | (2006.01) |
| G06K 15/02 | (2006.01) |
| G06K 15/00 | (2006.01) |

(52) U.S. Cl.
CPC .............. *G06K 15/40* (2013.01); *G03G 15/305* (2013.01); *G03G 21/14* (2013.01); *H04N 1/04* (2013.01)

(58) Field of Classification Search
CPC .................. G03G 21/0005; G03G 21/0011
See application file for complete search history.

(56) References Cited

U.S. PATENT DOCUMENTS

| | | | | |
|---|---|---|---|---|
| 4,579,467 | A * | 4/1986 | Furukawa | ................. 400/124.05 |
| 5,696,603 | A * | 12/1997 | Toyomura et al. | ........... 358/3.02 |
| 5,915,156 | A * | 6/1999 | Kizaki et al. | ................... 399/346 |
| 7,589,846 | B2 * | 9/2009 | Yoshida | ........................ 358/1.13 |
| 2002/0063771 | A1 * | 5/2002 | Nozaki et al. | ................. 347/235 |
| 2006/0001891 | A1 * | 1/2006 | Yoshida | ......................... 358/1.9 |
| 2007/0140721 | A1 * | 6/2007 | Shinohara et al. | .............. 399/72 |
| 2009/0003864 | A1 * | 1/2009 | Yamaguchi | ........ G03G 15/1615 399/66 |
| 2010/0141975 | A1 * | 6/2010 | Takaki | ......................... 358/1.12 |
| 2010/0150590 | A1 * | 6/2010 | Yoshino | ............. G03G 15/0194 399/49 |

FOREIGN PATENT DOCUMENTS

JP 09-034243 A 2/1997

* cited by examiner

*Primary Examiner* — Beniyam Menberu
(74) *Attorney, Agent, or Firm* — Rossi, Kimms & McDowell LLP (57) ABSTRACT

An image forming apparatus which is capable of obtaining stable and satisfactory cleaning performance and fixing performance without holding, in an image forming unit which forms an image on a recording material based on a video signal, data for performing maintenance of the image forming unit. A synchronization signal output from the image forming unit and indicative of timing with which the video signal is output is detected. It is determined whether the synchronization signal is a normal synchronization signal for outputting a video signal for use in forming an image on the recording material or a pattern synchronization signal for outputting a pattern signal that is a video signal for use in performing maintenance of the image forming unit. When the synchronization signal is the normal synchronization signal, the video signal is output. When the synchronization signal is the pattern synchronization signal, the pattern signal is output.

4 Claims, 7 Drawing Sheets

IMAGE FORMING APPARATUS THAT CONTROLS JETTING OF TONER, IMAGE PROCESSING APPARATUS, CONTROL METHOD THEREFOR, AND STORAGE MEDIUM

BACKGROUND OF THE INVENTION

1. Field of the Invention

The present invention relates to an image forming apparatus, an image processing apparatus, and a control method therefor, as well as a computer-readable storage medium storing a program for implementing the control method.

2. Description of the Related Art

As a cleaning method for use in an electrophotographic image forming apparatus, there is known a cleaning method in which toner is forcefully jetted from a developing device on a regular basis, and the toner is supplied to a cleaning blade of a photosensitive drum.

When a number of images with low print rate are printed, toner supplied to a developing roller from a toner container is left without being transferred, and deteriorated toner is accumulated on the developing roller.

When printing remains unperformed with the accumulated toner in the developing roller left standing, fusion of toner to the developing roller occurs due to an increase in the power with which the accumulated toner is attached to the developing roller, and an image defect which is so-called a fusion stripe may be formed in the area of toner fusion. Accordingly, in an image forming apparatus, it is necessary to perform cleaning in which toner is forcefully jetted to remove toner left on the developing roller on a regular basis.

Moreover, for example, when printing with low print rate continues, or when printing in a hot and humid environment continues, phenomena such as curling of a cleaning blade of a photosensitive drum or an intermediate transfer belt, chipping of an edge portion of the cleaning blade, and cleaning failure occur.

It is known that to cope with such phenomena, toner jetted from a developing device is distributed among a cleaning blade, an intermediate transfer belt, and so on using the cleaning method described above, and the distributed toner is used as a lubricant to prevent curling, cleaning failure, and so on described above.

As a method to control jetting of toner in the cleaning method described above, there is known a method in which toner is jetted so as to form a predetermined pattern held by an image forming unit that forms images so that a predetermined amount of toner can be forcefully consumed (see, for example, Japanese Laid-Open Patent Publication (Kokai) No. H09-034243).

According to the method disclosed in Japanese Laid-Open Patent Publication (Kokai) No. H09-034243, however, because toner is jetted according to a predetermined pattern held by the image forming unit, it is difficult to jet a small amount of toner, jet a large amount of toner, and partially increase or decrease the amount of toner jetted.

Moreover, when a toner jet pattern is selected according to an image to be printed, an optimum toner jet pattern can be selected based on the information on the image to be printed. In this case, however, because no consideration is given to a usage environment of an image forming apparatus, there is a problem that no optimum toner jet pattern suitable for a usage environment of the image forming apparatus having an image forming unit is created.

Further, because an image forming unit normally has a poor resource for holding data, it is difficult for the image forming unit to hold, in advance, an optimum toner jet pattern suitable for a usage environment of an image forming apparatus, or the like.

SUMMARY OF THE INVENTION

The present invention provides an image forming apparatus, an image processing apparatus, and a control method therefor, which are capable of obtaining stable and satisfactory cleaning performance and fixing performance without holding, in an image forming unit which forms an image on a recording material based on a video signal, data for performing maintenance of the image forming unit, as well as a computer-readable storage medium storing a program for implementing the control method.

Accordingly, a first aspect of the present invention provides an image processing apparatus capable of communicating with an image forming unit that forms an image on a recording material based on a video signal, comprising a detection unit configured to detect a synchronization signal output from the image forming unit and indicative of timing with which the video signal is output, a determination unit configured to determine whether the synchronization signal detected by the detection unit is a normal synchronization signal for outputting a video signal for use in forming an image on the recording material or a pattern synchronization signal for outputting a pattern signal that is a video signal for use in performing maintenance of the image forming unit, a video signal output unit configured to, when the determination unit determines that the synchronization signal is the normal synchronization signal, output the video signal for use in forming an image on the recording material, and a pattern signal output unit configured to output the pattern signal when the determination unit determines that the synchronization signal is the pattern synchronization signal.

Accordingly, a second aspect of the present invention provides an image forming apparatus comprising an image forming unit configured to form an image on a recording material based on a video signal, and an image processing apparatus configured to be capable of communicating with the image forming unit, and comprising a detection unit that detects a synchronization signal output the image forming unit and indicative of timing with which the video signal is output, a determination unit that determines whether the synchronization signal detected by the detection unit is a normal synchronization signal for outputting a video signal for use in forming an image on the recording material or a pattern synchronization signal for outputting a pattern signal that is a video signal for use in performing maintenance of the image forming unit, a video signal output unit that, when the determination unit determines that the synchronization signal is the normal synchronization signal, outputs the video signal for use in forming an image on the recording material; and a pattern signal output unit that outputs the pattern signal when the determination unit determines that the synchronization signal is the pattern synchronization signal.

Accordingly, a third aspect of the present invention provides a control method for an image processing apparatus capable of communicating with an image forming unit that forms an image on a recording material based on a video signal, comprising a detection step of detecting a synchronization signal output from the image forming unit and indicative of timing with which the video signal is output, a determination step of determining whether the synchronization signal detected in the detection step is a normal synchronization signal for outputting a video signal for use in forming an image on the recording material or a pattern synchronization signal for outputting a pattern signal that is a video signal for use in performing maintenance of the image forming unit, a video signal output step of, when it is determined in the determination step that the synchronization signal is the normal synchronization signal, outputting the video signal for use in forming an image on the recording material, and a pattern signal output step of outputting the pattern signal when it is determined in the determination step that the synchronization signal is the pattern synchronization signal.

Accordingly, a fourth aspect of the present invention provides a non-transitory computer-readable storage medium storing a program for causing a computer to implement a control method for an image processing apparatus capable of communicating with an image forming unit that forms an image on a recording material based on a video signal, the control method comprising a detection step of detecting a synchronization signal output from the image forming unit and indicative of timing with which the video signal is output, a determination step of determining whether the synchronization signal detected in the detection step is a normal synchronization signal for outputting a video signal for use in forming an image on the recording material or a pattern synchronization signal for outputting a pattern signal that is a video signal for use in performing maintenance of the image forming unit, a video signal output step of, when it is determined in the determination step that the synchronization signal is the normal synchronization signal, outputting the video signal for use in forming an image on the recording material, and a pattern signal output step of outputting the pattern signal when it is determined in the determination step that the synchronization signal is the pattern synchronization signal.

According to the present invention, whether a detected synchronization signal is a normal synchronization signal or a pattern synchronization signal is determined, and when it is determined that the detected synchronization signal is a pattern synchronization signal, a pattern signal is output. As a result, stable and satisfactory cleaning performance and fixing performance can be obtained without holding, in the image forming unit, data for performing maintenance of the image forming unit.

Further features of the present invention will become apparent from the following description of exemplary embodiments (with reference to the attached drawings).

DESCRIPTION OF THE EMBODIMENTS

The present invention will now be described with reference to the drawings showing an embodiment thereof.

Figure 1:
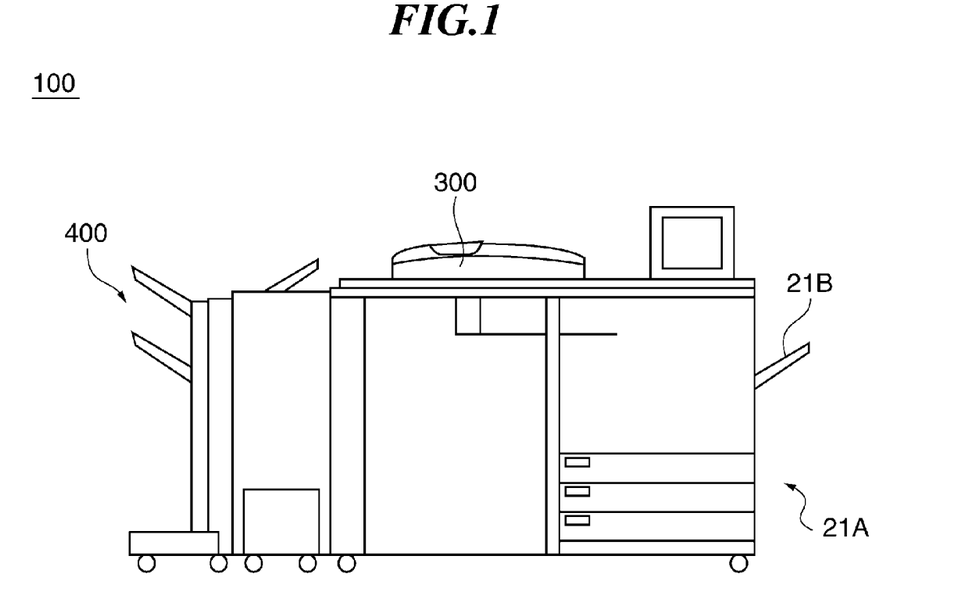
FIG. 1 is a side view schematically showing an appearance of an image forming apparatus according to an embodiment of the present invention.

FIG. 1 is a side view schematically showing an appearance of an image forming apparatus 100 according to an embodiment of the present invention.

Referring to FIG. 1, the image forming apparatus 100 is comprised of an original reader 300, a sheet discharge tray 400, sheet feeding units 21A and 21B, and so on. The image forming apparatus 100 also has an image forming unit 201 (FIG. 2) and a control unit 301 (FIG. 3), which will be described later.

The original reader 300 scans an image on an original by exposing the same to light to obtain reflected light, inputs the reflected light to a CCD, and thus converts information on this image into an electric signal. Further, the original reader 300 converts the electric signal into a luminance signal comprised of RGB color signals and outputs the luminance signal as image data to the control unit 301. An automatic feeding method or a method in which an original placed on a glass surface, not shown, scanned is used as a method to read an original.

An image is formed on a transfer material (recording material), which is placed on the sheet feeding unit 21A or 21B, by the image forming unit 201, and then the transfer material is discharged onto the sheet discharge tray 400. In the following description, forming an image on a transfer material may be expressed as printing.

Figure 2:
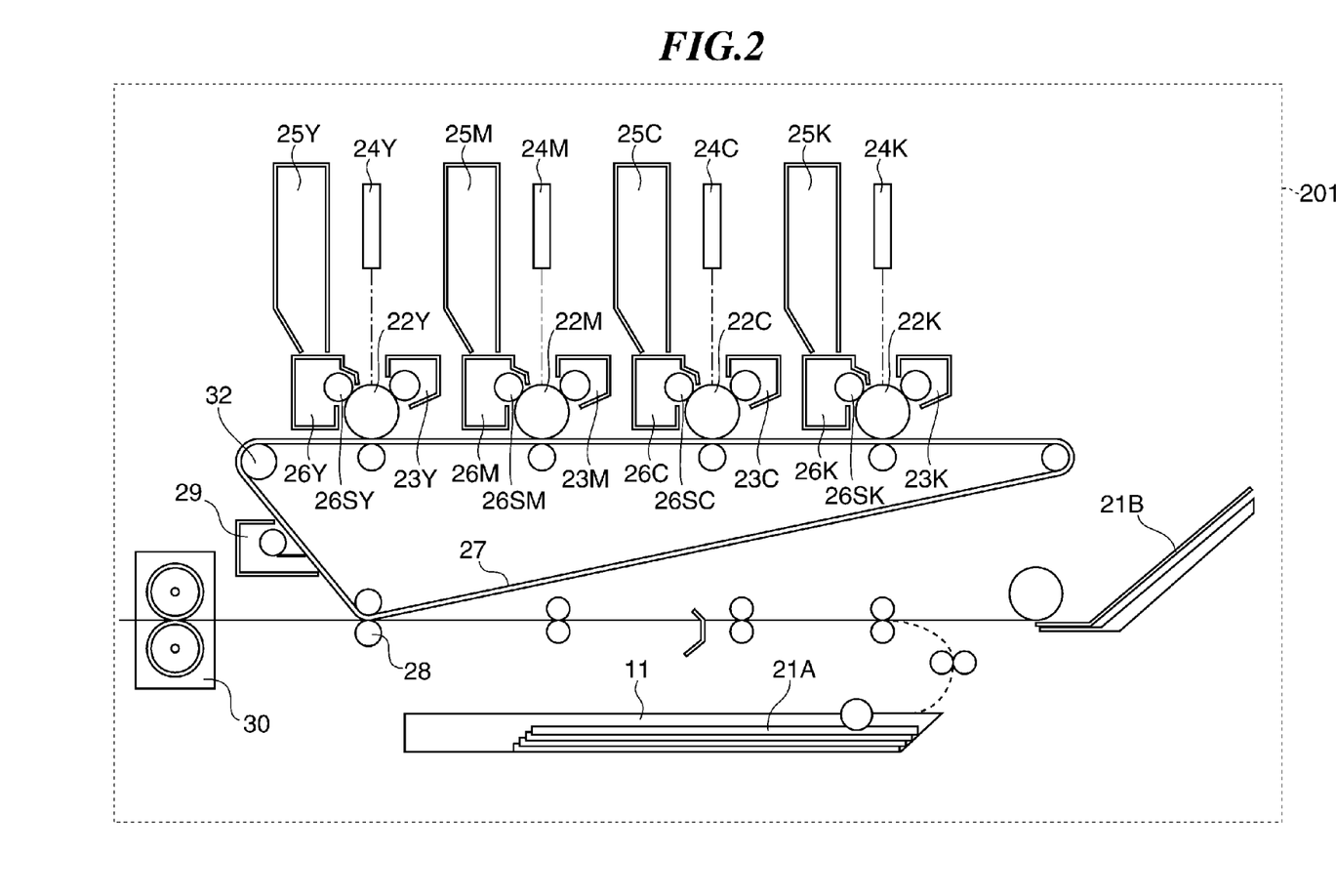
FIG. 2 is a view schematically showing an arrangement of an image forming unit which the image forming apparatus in FIG. 1 has.

FIG. 2 is a view schematically showing an arrangement of the image forming unit 201 which the image forming apparatus 100 in FIG. 1 has.

The image forming unit 201 forms a color image using toners of yellow Y, magenta M, cyan C, and black K. In FIG. 2, reference numerals with YMCK added thereto correspond to the respective colors, and in the following description, YMCK added to the reference numerals is omitted from description common to all the colors.

The image forming unit 201 is comprised of a photosensitive drum 22, an implantation charger 23, a scanner unit 24, a toner cartridge 25, a developing device 26, a developing sleeve 26S, an intermediate transfer belt 27, a transfer roller 28, a cleaning unit 29, a fixing unit 30, and a drive roller 32.

When an image is to be formed, the photosensitive drum 22 which is rotating is charged with electricity by the implantation charger 23, and then a surface of the photosensitive drum 22 is exposed to light by irradiation of laser light from the scanner unit 24 to form an electrostatic latent image on the photosensitive drum 22.

The electrostatic latent image on the photosensitive drum 22 is developed by the toners of the respective colors in the developing device 26 and rendered as visible images in the respective colors. The toner images rendered as the visible images in the respective colors are then superposed on top of one another and transferred as a multicolor toner image to the intermediate transfer belt 27 which rotates clockwise as the photosensitive drum 22 rotates.

The multicolor toner image transferred to the intermediate transfer belt 27 is then transferred to a transfer material 11 fed from the sheet feeding unit 21A or 21B. The transferred multicolor toner image is heated and pressurized in the fixing unit 30 and thus fixed to a surface of the transfer material 11.

The transfer material 11 to which the toner image has been fixed is discharged onto the sheet discharge tray 400 by a discharging roller, not shown. Toner remaining on the intermediate transfer belt 27 is removed by the cleaning unit 29, and the removed toner is stored in a cleaner container, not shown.

Figure 3:
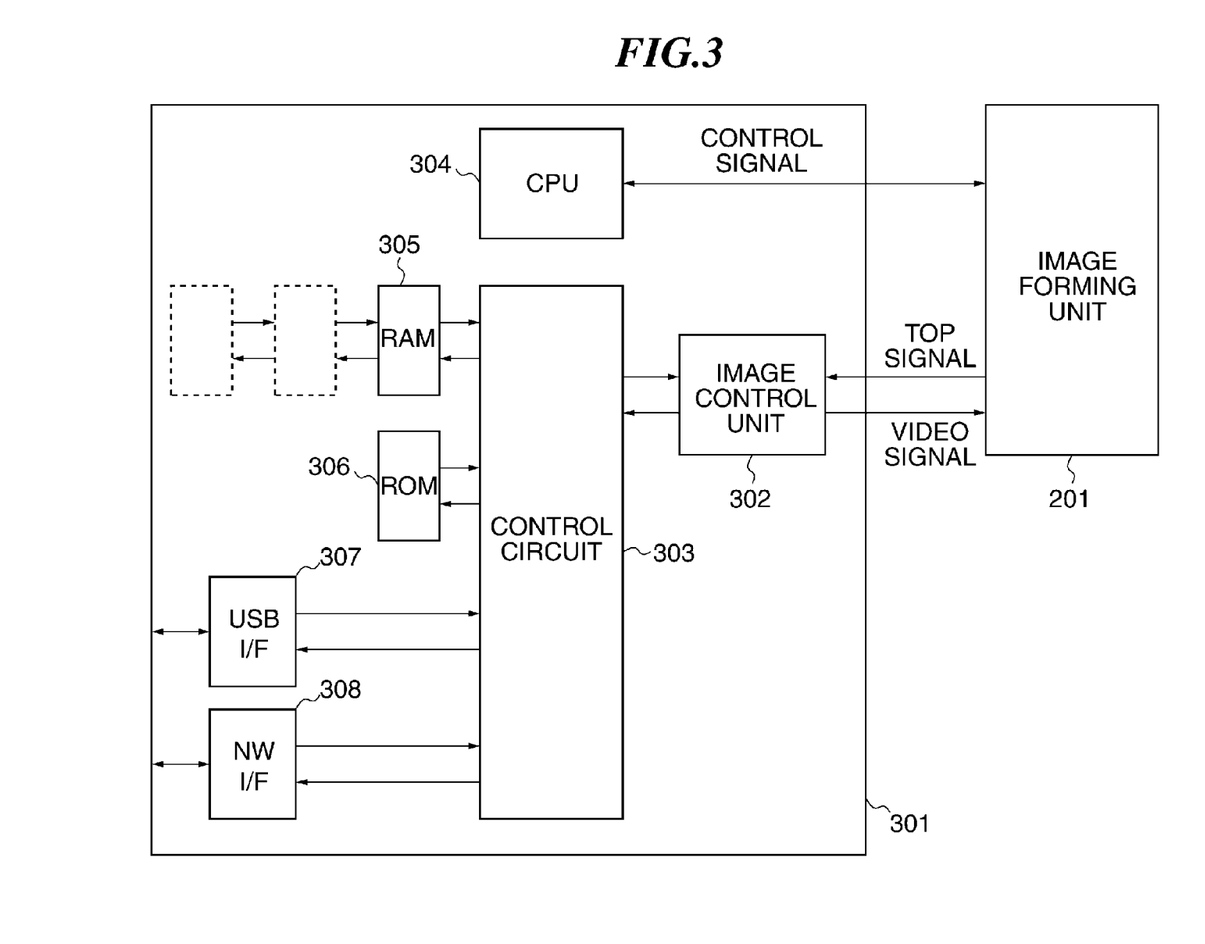
FIG. 3 is a block diagram schematically showing an arrangement of a control unit constituting the image forming apparatus in FIG. 1.

FIG. 3 is a block diagram schematically showing an arrangement of the control unit 301 constituting the image forming apparatus 100 in FIG. 1.

Referring to FIG. 3, the control unit 301, which is an image processing apparatus according to the present invention, is comprised of a CPU 304, a control circuit 303, a RAM 305, a ROM 306, a USB interface 307, a network interface 308, and an image control unit 302.

The CPU 304 controls the overall operation of the image forming apparatus 100 by executing various programs stored in the ROM 306. The RAM 305 is used as a work memory for the CPU 304 and also stores, for example, data for printing received from a host computer. More RAM 305 may be added as indicated by broken lines in the figure.

The control circuit 303, which is an ASIC (application specific integrated circuit), is connected to the CPU 304, the ROM 306, the RAM 305, and the image forming unit 201, and controls, for example, transfer of video signals to the image forming unit 201.

The USB interface 307 is an interface between USB equipment and the control unit 301. The network interface 308 is an interface between a network and the control unit 301 and sends and receives control signals and data to and from a host computer on the network.

The image control unit 302 converts image data of the respective colors into a video signal and transfers it to the image forming unit 201. As shown in the figure, the CPU 304 sends and receives control signals to and from the image forming unit 201. Thus, the control unit 301 is capable of communicating with the image forming unit 201.

With the arrangement described above, the image forming unit 201 which has received an instruction to start printing from the CPU 304 starts conveying the transfer material 11 from the sheet feeding unit 21A or 21B. When a sensor, not shown, detects a leading end of the conveyed transfer material 11 passing a specific position, a sub-scanning synchronization signal (hereafter referred to as the "TOP signal") which is a synchronization signal according to the present invention is transmitted from the image forming unit 201 to the image control unit 302.

The image control unit 302 which has received the TOP signal from the image forming unit 201 requests image data from the control circuit 303, thus converting image data stored in the RAM 305 into a video signal and outputting the video signal to the image forming unit 201.

Figure 4:
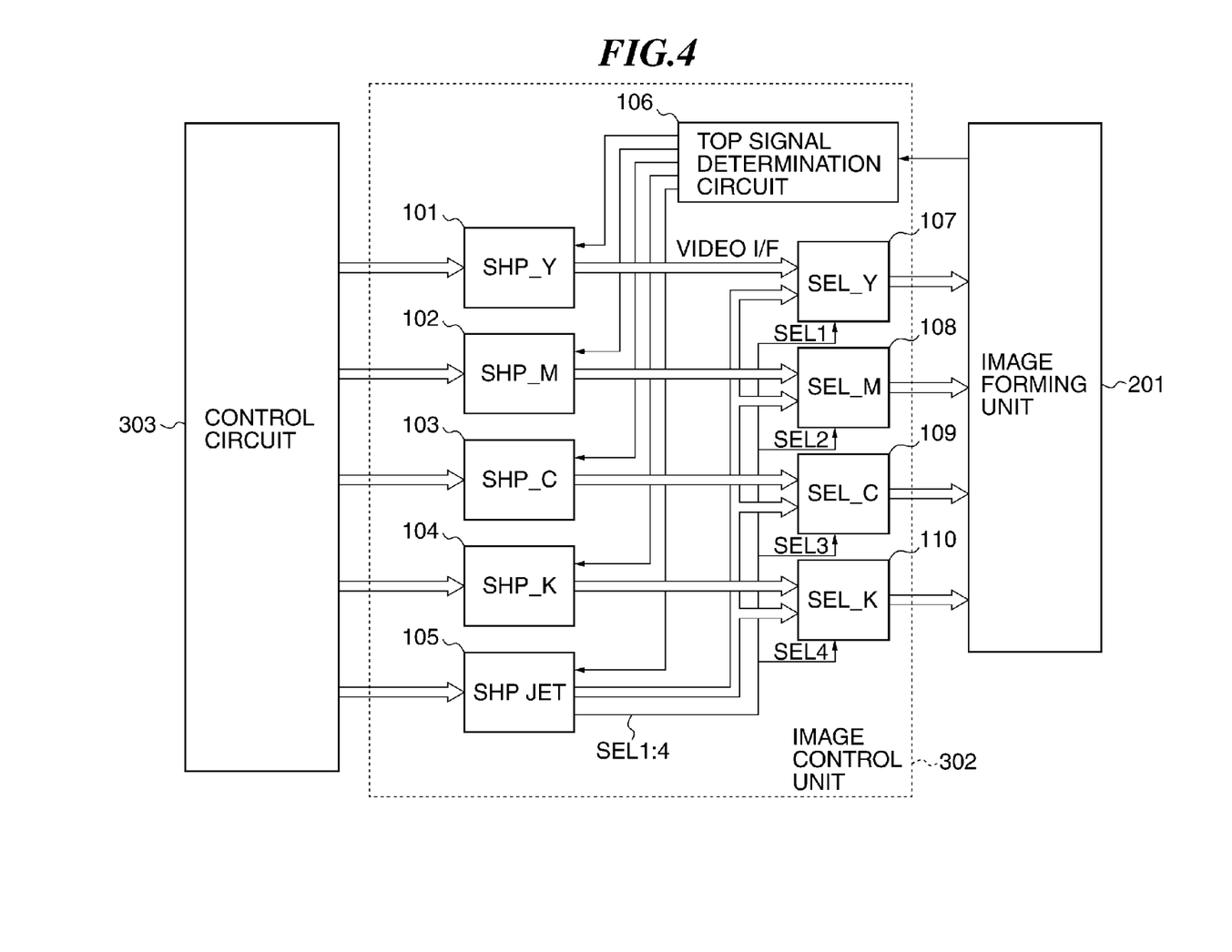
FIG. 4 is a block diagram schematically showing an arrangement of an image control unit in FIG. 3.

FIG. 4 is a block diagram schematically showing an arrangement of the image control unit 302 in FIG. 3.

Referring to FIG. 4, the image control unit 302 is comprised of an SHP_Y 101, an SHP_M 102, an SHP_C 103, an SHP_K 104, an SHP jet 105, a TOP signal determination circuit 106, an SEL_Y 107, an SEL_M 108, an SEL_C 109, and an SEL_K 110.

Bit-mapped image data is input from the control circuit 303 to the SHP_Y 101, the SHP_M 102, the SHP_C 103, and the SHP_K 104. At this time, the image data output from the control circuit 303 is image data that is output from the original reading device 300 and stored in the RAM 305.

The SHP_Y 101, the SHP_M 102, the SHP_C 103, and the SHP_K 104 convert the input image data into video signals, which are for use in forming images on a recording material, and outputs the video signals to the SEL_Y 107, the SEL_M 108, the SEL_C 109, and the SEL_K 110, respectively. The SEL_Y 107, the SEL_M 108, the SEL_C 109, and the SEL_K 110 (video signal output units) are circuits that selectively output video signals to the image forming unit 201.

The SHP jet 105 outputs an SEL 1:4 signal, which is for use in selectively outputting an image formation video signal for forming an image on a transfer material or a jet pattern signal for jetting toner when performing maintenance of the image forming unit 201, to the SEL_Y 107, the SEL_M 108, the SEL_C 109, and the SEL_K 110. The SHP jet 105 (pattern signal output unit) converts jet pattern data, which is stored in an area different from an area in which image data is stored in the RAM 305, into jet pattern signals and outputs the jet pattern signals to the SEL_Y 107, the SEL_M 108, the SEL_C 109, and the SEL_K 110.

In response to receipt of the SEL 1:4 signal, the SEL_Y 107, the SEL_M 108, the SEL_C 109, and the SEL_K 110 output jet pattern signals to the image forming unit 201. For example, when the SHP jet 105 outputs an SEL 1 signal to the SEL_Y 107, the SEL_Y 107 which has received the SEL 1 signal outputs a jet pattern signal to the image forming unit 201.

In the SHP_Y 101, the SHP_M 102, the SHP_C 103, and the SHP_K 104 described above, the number of pixels in a main scanning direction of a print range and the number of lines in a sub scanning direction of the print range are set in advance before printing is started.

The set number of pixels in the main scanning direction and the set number of lines in the sub scanning direction are transferred as video signals to the image forming unit 201 in synchronization with a main scanning synchronization signal, not shown, and a TOP signal. The TOP signal acts as a timing signal indicative of a position at which writing of an image starts.

It should be noted that in the SHP jet 105 as well, the number of pixels in a main scanning direction of a print range and the number of lines in a sub scanning direction of the print range can be set in advance, and moreover, in the SHP jet 105, the number of pixels in a main scanning direction of a print range and the number of lines in a sub scanning direction of the print range can be set differently for the colors YMCK.

In the present embodiment, the TOP signal determination circuit 106 (determination unit) detects a TOP signal output from the image forming unit 201, and further creates a jet enable signal, to be described alter. The TOP signal determination circuit 106 determines that a TOP signal detected within a predetermined time period in which the jet enable signal is H (an upper level of the jet enable signal in FIG. 5B) is a jet TOP signal (pattern synchronization signal) indicative of the timing with which jetting of toner is started. The TOP signal determination circuit 106 determines that the other TOP signals are image formation TOP signals (normal synchronization signals) for outputting video signals for use in forming images on recording materials.

After the above determination, the TOP signal determination circuit 106 outputs a TOP_Y signal, a TOP_M signal, a TOP_C signal, a TOP_K signal, and a TOP_S signal to the SHP_Y 101, the SHP_M 102, the SHP_C 103, the SHP_K 104, and the SHP jet 105, respectively in response to TOP signals output from the image forming unit 201 to let them know the start timing of image writing, that is, the timing with which video signals are output.

In the present embodiment, images are formed in the order of YMCK, and after a predetermined time period (TOP margin) has elapsed, the SHP_Y 101, the SHP_M 102, the SHP_C 103, and the SHP_K 104 which have received respective TOP signals from the TOP signal determination circuit 106 output video signals to the SEL_Y 107, the SEL_M 108, the SEL_C 109, and the SEL_K 110, respectively.

To print a plurality of images in succession, when output of a video signal for the first image is completed, output of a video signal for the second image is started in synchronization with a next TOP signal.

Figure 5A:
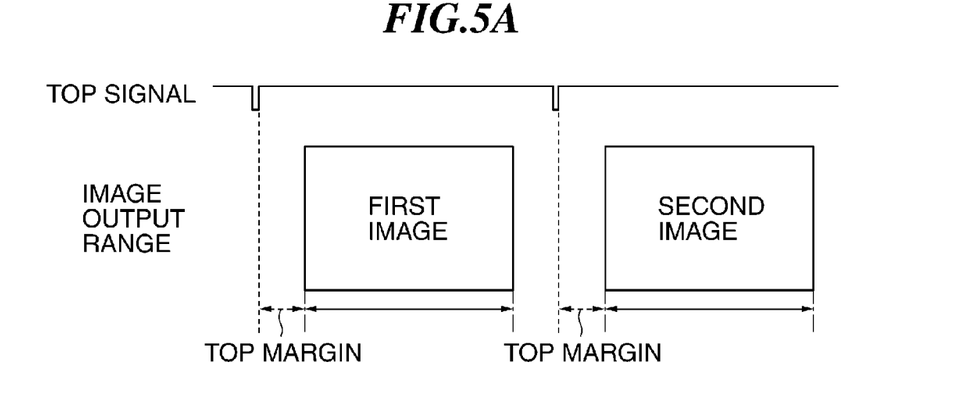
FIGS. 5A and 5B are views which are useful in explaining output timing and output range of signals in a printing process according to the present embodiment.
Figure 5B:
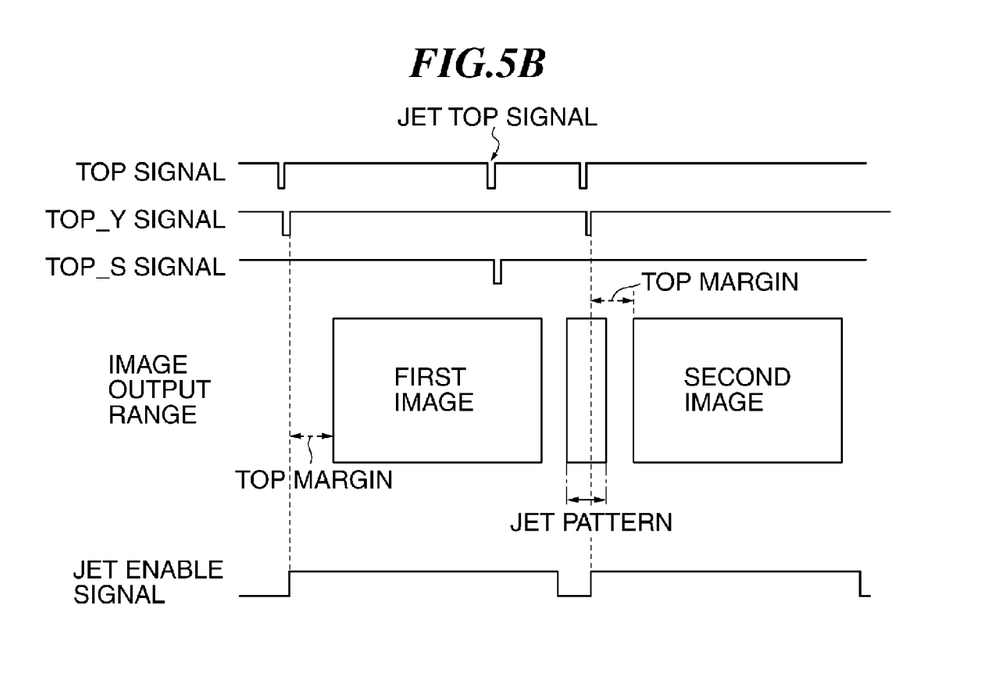

FIGS. 5A and 5B are views which are useful in explaining output timing and output range of signals in a printing process according to the present embodiment.

FIG. 5A is a view showing output timing and output ranges of a TOP signal and a video signal.

In FIG. 5A, image output ranges represent ranges within which video signals are output when the first image and the second images are printed. As shown in this figure, when a TOP margin (see the figure) has elapsed since a TOP signal had been detected, a video signal is output to form an image.

FIG. 5B is a view showing output timing and output range of a TOP signal and a video signal, and output timing and output range of a jet pattern signal.

As compared to FIG. 5A, a TOP_Y signal, a TOP_S signal, a jet enable signal, and an output range of a jet pattern signal are additionally shown in FIG. 5B.

The "TOP_Y signal" is a signal output to the SHP_Y 101 by the TOP signal determination circuit 106 which has detected an image formation TOP signal, and in FIG. 5B, the timing with which the TOP_Y signal is output is shown. The "TOP_S signal" is a signal output to the SHP jet 105 by the TOP signal determination circuit 106 which has detected a jet TOP signal, and in FIG. 5B, the timing with which the TOP_S signals is output is shown.

As described above, the jet enable signal is a signals for use in determining a jet TOP signal indicative of the timing with which jetting of toner is started. If the jet enable signal is L (the jet enable signal in the figure is at a lower level) when the TOP signal is detected, the TOP signal determination circuit 106 outputs the TOP_Y signal to the SHP_Y 101 and raises the jet enable signal to H.

On the other hand, when as shown in the figure, a TOP signal is further detected within a predetermined time period for which the jet enable signal is H, the TOP signal determination circuit 106 determines that the further detected TOP signal is a jet TOP signal, and outputs a TOP_S signal to the SHP jet 105.

It should be noted that the TOP signal determination circuit 106 sets a jet enable signal to L when it has determined that the detected TOP signal is a jet TOP signal or has counted to a number corresponding to the number of lines in the sub scanning direction set in advance.

Thereafter, based on the output TOP_S signal, the SHP jet 105 outputs an SEL 1:4 signal, causing the SEL_Y 107, the SEL_M 108, the SEL_C 109, and the SEL_K 110 to output jet pattern signals. Normally, jet pattern signals are prepared in several patterns, but in the present embodiment, pattern data suited to the amount of toner to be jet and operation environments may be added as the need arises.

Thus, in the present embodiment, after it is determined that a TOP signal is an image formation TOP signal, when a TOP signal is further detected within a predetermined time period, that is, a time period that elapses before counting to a number corresponding to the number of lines in the sub scanning direction set in advance, it is determined that the further detected TOP signal is a jet TOP signal.

Figure 6:
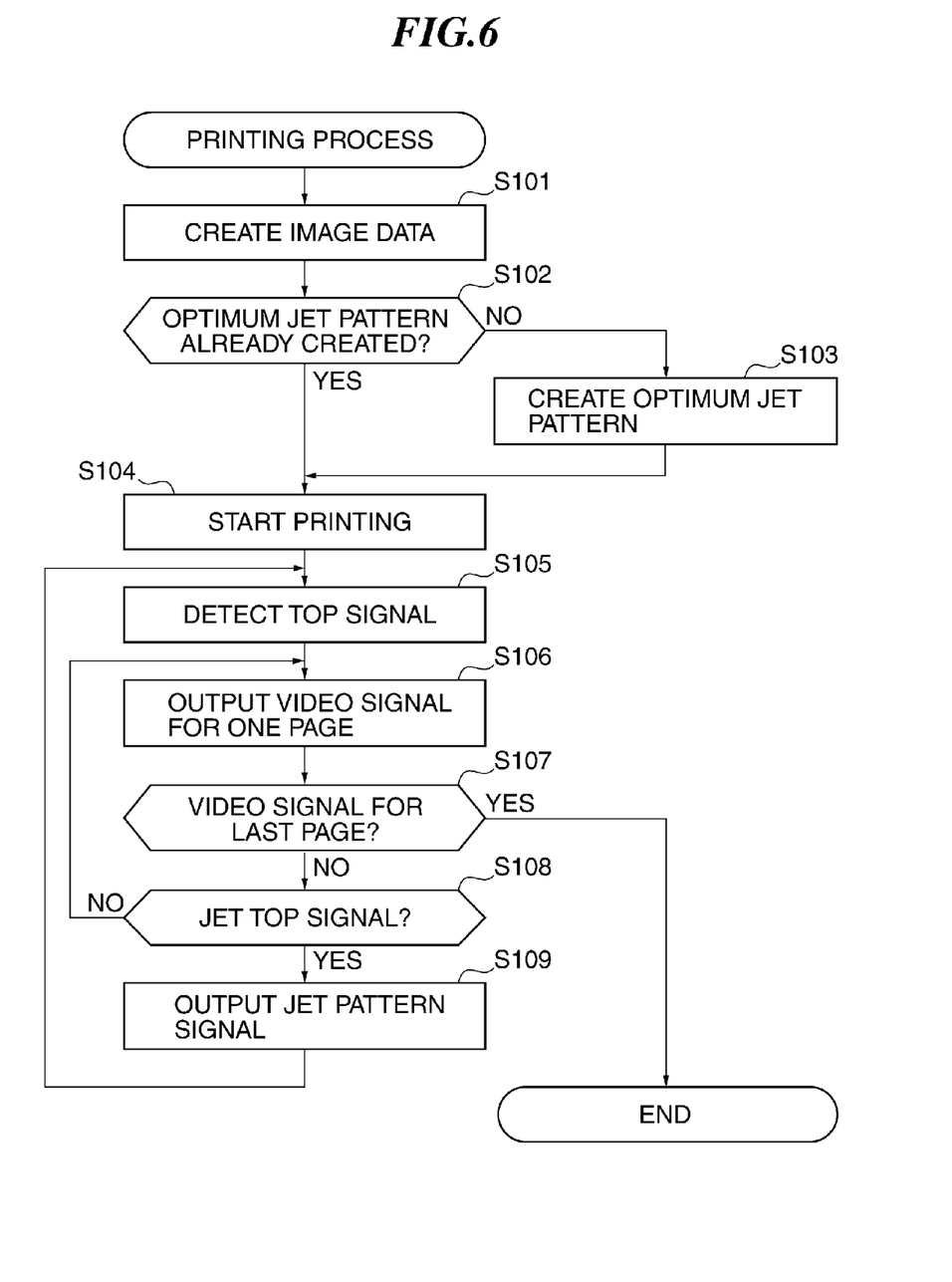
FIG. 6 is a flowchart showing the procedure of the printing process carried out by a CPU or the like in FIG. 3.

FIG. 6 is a flowchart showing the procedure of the printing process carried out by the CPU 304 or the like in FIG. 3.

This printing process is carried out by the CPU 304 executing a program, which is stored in the ROM 306 and decompressed onto the RAM 305. First, image data to be printed on a transfer material is created (step S101). The image data should not necessarily be created by the image forming apparatus 100, but for example, one which is created by other equipment such as a host computer may be obtained.

It is then determined whether or not optimum jet pattern data for the created image data has already been created (step S102). The optimum jet pattern data, which is pattern data that enables toner to be effectively jetted to image data to be printed, is selected from various types of pattern data prepared in advance and stored in the RAM 305, or automatically created when there is no optimum pattern data in the pattern data created in advance.

As a result of the determination in the step S102, when the optimum jet pattern data has already been created (YES in the step S102), the process proceeds to step S104. On the other hand, as a result of the determination in the step S102, when the optimum jet pattern data has not yet been created (NO in the step S102), the optimum jet pattern data is created (step S103).

The control unit 301 outputs a print starting instruction to the image forming unit 201, and based on the print starting instruction, the image forming unit 201 starts printing (step S104). At this time, the image forming unit 201 outputs a TOP signal to the TOP signal determination circuit 106 of the image control unit 302 constituting the control unit 301.

Upon detecting the TOP signal output from the image forming unit 201 (step S105), the TOP signal determination circuit 106 outputs a TOP_Y signal to the SHP_Y 101. The SHP_Y 101 outputs a video signal for one page of image data to the image forming unit 201 via the SEL_Y 107 (step S106). It is then determined whether or not the output video signal is a video signal for the last page of the image data to be printed (step S107).

As a result of the determination in the step S107, when the output video signal is a video signal for the last page (YES in the step S107), the present process is brought to an end. On the other hand, as a result of the determination in the step S107, when the output video signal is not a video signal for the last page (NO in the step S107), and a TOP signal is further detected, the TOP signal determination circuit 106 determines whether or not the further detected TOP signal is a jet TOP signal (step S108). The determination method used here follows the method described above with reference to FIG. 5B.

As a result of the determination in the step S108, when the further detected TOP signal is not a jet TOP signal (NO in the step S108), the process returns to the step S106.

On the other hand, as a result of the determination in the step S108, when the further detected TOP signal is a jet TOP signal (YES in the step S108), the TOP signal determination circuit 106 outputs a TOP_S signal to the SHP jet 105. The SHP jet 105 outputs a jet pattern signal to the image forming unit 201 via the SEL_Y 107 (step S109), and the process returns to the step S105. It should be noted that although in the process in FIG. 6, toner in the Y color is taken as an example in the description of control relating to output of a video signal, the same control is provided for toner in the other MCK colors as well.

Although in the embodiment described above, whether or not a TOP signal is a jet TOP signal is determined using the TOP signal and a jet enable signal, the determination method is not limited to this. A variation of the determination method will now be described.

Figure 7A:
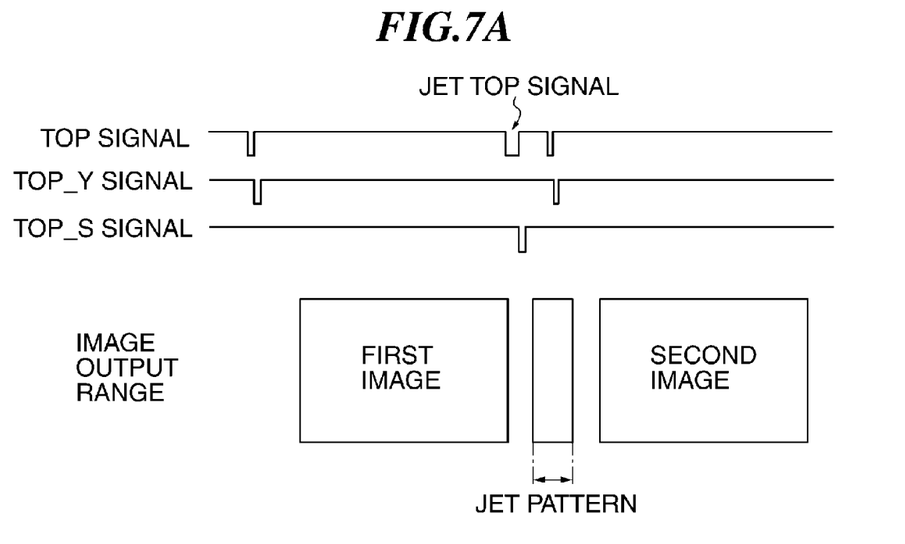
FIG. 7A is a view which is useful in explaining a first variation of a jet TOP signal determination method.
Figure 7B:
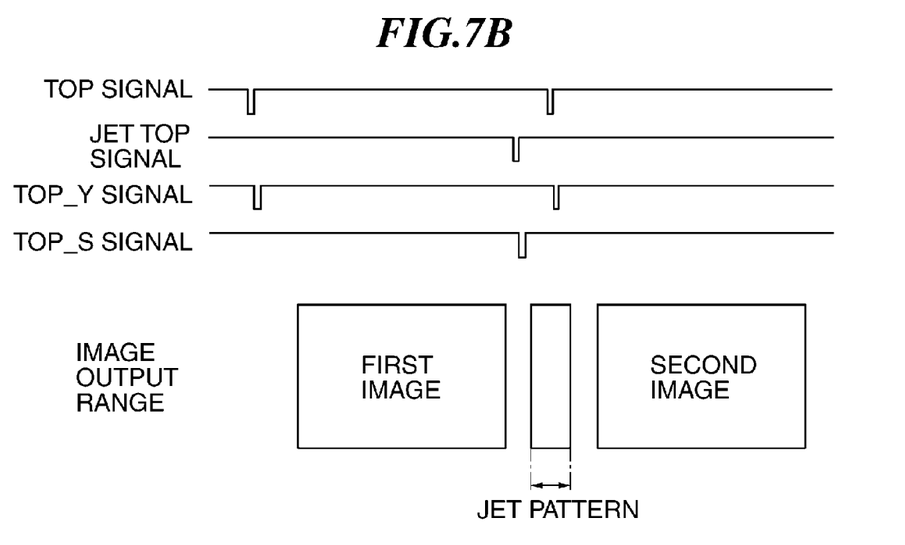
FIG. 7B is a view which is useful in explaining a second variation of the jet TOP signal determination method.

FIG. 7A is a view which is useful in explaining a first variation of a jet TOP signal determination method, and FIG. 7B is a view which is useful in explaining a second variation of the jet TOP signal determination method.

FIG. 7A shows that a pulse width of a jet TOP signal differs from a pulse width of an image formation TOP signal.

When a TOP signal with a pulse width different from that of an image formation TOP signal is detected, the TOP signal determination circuit 106 determines that the detected TOP signal is a jet TOP signal.

Upon determining that the detected TOP signal is an image formation TOP signal, the TOP signal determination circuit 106 outputs a TOP_Y signal to the SHP_Y 101. The same control is provided for toner in the other MCK colors as well.

On the other hand, upon determining that the detected TOP signal is a jet TOP signal, the TOP signal determination circuit 106 outputs a TOP_S signal to the SHP jet 105. As a result, even when signals shown in FIG. 7A are used, the printing process can be controlled in the same manner as in the process in FIG. 6.

FIG. 7B shows that a jet TOP signal is provided as a signal different from an image formation TOP signal.

Upon determining that the detected TOP signal is an image formation TOP signal, the TOP signal determination circuit 106 outputs a TOP_Y signal to the SHP_Y 101. The same control is provided for the other MCK colors as well.

On the other hand, upon determining that the detected TOP signal is a jet TOP signal, the TOP signal determination circuit 106 outputs a TOP_S signal to the SHP jet 105. As a result, even when the signals shown in FIG. 7B are used, the printing process can be controlled in the same manner as in the process in FIG. 6.

As described above, according to the present embodiment, whether a detected synchronization TOP signal is an image formation TOP signal or a jet TOP signal for performing maintenance of the image forming unit 201 is determined (step S108), and when it is determined that the TOP signal is a jet TOP signal, a jet pattern signal is output (step S109).

As a result, maintenance of the image forming unit 201 can be performed without holding data, which is for use in performing maintenance of the image forming unit 201, in the image forming unit 201 which forms images on recording materials based on video signals.

Moreover, flexible response can be realized by preparing or creating various toner jet patterns in advance in the image processing apparatus 100. Thus, for example, a small and appropriate amount of toner, which is consumed by jetting of toner, can be supplied, and as a result, stable and satisfactory cleaning performance and fixing performance can be obtained.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-138803, filed Jul. 2, 2013, which is hereby incorporated by reference herein in its entirety.

What is claimed is:

1. An image processing apparatus capable of communicating with an image forming unit that forms an image on a recording material based on a video signal, comprising:
   a detection unit configured to detect a synchronization signal output from the image forming unit and indicative of timing with which the video signal is output to the image forming unit;
   a setting unit configured to set an enable signal to high or low in such a manner that the enable signal is set to high based on the detection unit detecting the synchronization signal and the enable signal is set to low based on a predetermined time period elapsing after the detection unit detects the synchronization signal;
   a first video signal output unit configured to output, if the detection unit detects the synchronization signal during the enable signal being set to low, a video signal for use in forming a first type image to the image forming unit; and
   a second video signal output unit configured to output, if the detection unit detects the synchronization signal during the enable signal being set to high, a video signal for use in forming a second type image to the image forming unit.

2. The image processing apparatus according to claim 1, wherein the first video signal output unit outputs the video signal for use in forming the first type image to the image forming unit with a timing which is determined on a basis of a detection timing of the synchronization signal detected by the detection unit.

3. The image processing apparatus according to claim 2, wherein the second video signal output unit outputs the video signal for use in forming the second type image to the image forming unit with a timing which is determined on a basis of a detection timing of the synchronization signal detected by the detection unit.

4. The image processing apparatus according to claim 1,
   wherein the first video signal output unit outputs the video signal to the image forming unit, and the image forming unit forms the first type image as an image which is to be printed on a recording medium, and
   wherein the second video signal output unit outputs the video signal to the image forming unit, and the image forming unit forms the second type image as an image which is not to be printed on a recording medium and used for a maintenance of the image forming unit.

* * * * *